US010419905B2

(12) United States Patent
Sellschopp

(10) Patent No.: US 10,419,905 B2
(45) Date of Patent: Sep. 17, 2019

(54) METHOD AND DEVICE FOR INDIRECTLY TRANSFERRING INFORMATION FROM A FIRST MOBILE TRANSMITTING COMPONENT TO A STATIONARY SERVER DEVICE VIA A SECOND MOBILE TRANSMITTING COMPONENT

(71) Applicant: Audi AG, Ingolstadt (DE)

(72) Inventor: Stefan Sellschopp, Dachau (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/088,418

(22) PCT Filed: Mar. 31, 2017

(86) PCT No.: PCT/EP2017/057646
§ 371 (c)(1),
(2) Date: Sep. 25, 2018

(87) PCT Pub. No.: WO2017/178242
PCT Pub. Date: Oct. 19, 2017

(65) Prior Publication Data
US 2019/0208385 A1  Jul. 4, 2019

(30) Foreign Application Priority Data
Apr. 15, 2016  (DE) .................. 10 2016 004 561

(51) Int. Cl.
*H04W 12/06* (2009.01)
*H04W 4/44* (2018.01)
(Continued)

(52) U.S. Cl.
CPC ........ *H04W 4/44* (2018.02); *G06K 19/06037* (2013.01); *H04W 4/80* (2018.02); *H04W 12/04033* (2019.01)

(58) Field of Classification Search
CPC ..... H04W 64/00; H04W 4/025; H04W 4/029; H04W 88/005; H04W 4/02; H04W 4/21;
(Continued)

(56) References Cited

U.S. PATENT DOCUMENTS 9,262,460 B2   2/2016 Hanke
2008/0113672 A1* 5/2008 Karr .................. G01S 1/026
                                                    455/456.1
(Continued)

FOREIGN PATENT DOCUMENTS

CN    103828407 A    5/2014
DE    102012012565 A1   12/2013
(Continued)

OTHER PUBLICATIONS

English-language abstract of German Patent Application Publication No. 102012211731 A1, published on May 22, 2014; 2 pages.
(Continued)

*Primary Examiner* — Sai Aung
(74) *Attorney, Agent, or Firm* — Sterne, Kessler, Goldstein & Fox P.L.L.C.

(57) ABSTRACT

A method is disclosed for indirectly transferring information from a first mobile transmitting component to a stationary server device via a second mobile transmitting component, wherein the information is transferred from the first mobile transmitting component to the second mobile transmitting component via a first transfer interface and from the second mobile transmitting component to the server device. The information is represented by data during the transfer. The data are dynamically generated by the first mobile transmitting component for transfer of the information. Therefore, different data are produced to prevent repeated transfer of the information and/or to transfer the information to another server device. The information contained in the data is
(Continued)

accepted by the server device if the data satisfy a predefined validation criterion.

11 Claims, 1 Drawing Sheet

(51) Int. Cl.
*G06K 19/06* (2006.01)
*H04W 12/04* (2009.01)
*H04W 4/80* (2018.01)

(58) Field of Classification Search
CPC ........... H04W 74/02; H04W 36/00837; H04W 36/32; H04W 4/04; H04W 4/40; G01S 1/026; G01S 1/028; G01S 2205/006; G01S 2205/008; G01S 5/0009; G01S 5/0018; G01S 5/0054; G01S 5/02; G01S 5/021; G01S 5/0252; G01S 5/0257; G01S 5/0278; G01S 5/06; G01S 5/0263; G01S 5/10; G01S 19/39
See application file for complete search history.

(56) References Cited

U.S. PATENT DOCUMENTS

| | | | | |
|---|---|---|---|---|
| 2009/0103501 A1* | 4/2009 | Farrag | ................... | H04W 74/02 |
| | | | | 370/337 |
| 2012/0300985 A1* | 11/2012 | Ito | ........................... | G06F 21/32 |
| | | | | 382/103 |
| 2013/0042314 A1 | 2/2013 | Kelley | | |
| 2014/0155072 A1* | 6/2014 | Hellmann | ............. | H04W 36/32 |
| | | | | 455/440 |
| 2014/0270158 A1 | 9/2014 | Peirce | | |
| 2015/0161643 A1* | 6/2015 | Randell | ................... | H04W 4/21 |
| | | | | 705/14.26 |
| 2015/0188918 A1 | 7/2015 | Singaravelu | | |
| 2015/0226858 A1* | 8/2015 | Leibner | ................. | G01S 19/215 |
| | | | | 342/357.59 |
| 2017/0156062 A1 | 6/2017 | Dieckmann et al. | | |
| 2018/0317059 A1 | 11/2018 | Jin et al. | | |

FOREIGN PATENT DOCUMENTS

| | | |
|---|---|---|
| DE | 102012211731 A1 | 5/2014 |
| DE | 102013100756 B3 | 6/2014 |
| DE | 102014010752 A1 | 1/2016 |
| EP | 2211499 A1 | 7/2010 |

OTHER PUBLICATIONS

English-language abstract of German Patent Application Publication No. 102013100756 B3, published on Jun. 18, 2014; 1 page.

International Search Report and Written Opinion of the International Search Authority directed to related International Patent Application No. PCT/EP2017/057646, dated Jul. 4, 2017, with attached English-language translation; 26 pages.

Written Opinion of the International Preliminary Examining Authority directed to International Patent Application No. PCT/EP2017/057646, dated Mar. 12, 2018, with attached English-language translation; 13 pages.

International Preliminary Report on Patentability directed to related International Patent Application No. PCT/EP2017/057646, dated Jul. 2, 2018, with attached English-language translation; 12 pages.

* cited by examiner

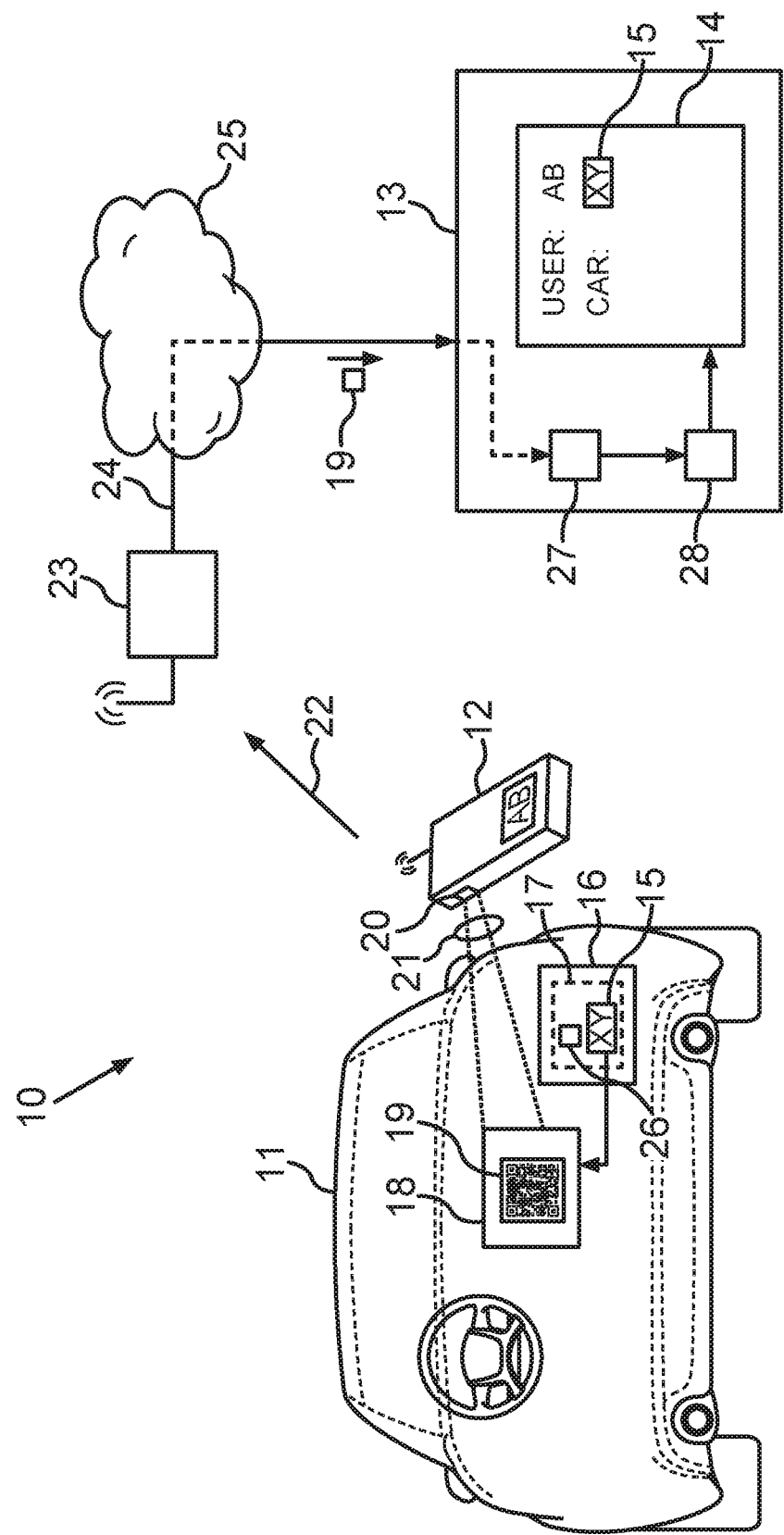

# METHOD AND DEVICE FOR INDIRECTLY TRANSFERRING INFORMATION FROM A FIRST MOBILE TRANSMITTING COMPONENT TO A STATIONARY SERVER DEVICE VIA A SECOND MOBILE TRANSMITTING COMPONENT

TECHNICAL FIELD

This disclosure relates to a method and device for indirectly transferring information from a first mobile transmitting component to a stationary server device via a second mobile transmitting component.

BACKGROUND

This disclosure relates to a method for indirectly transferring information from a first mobile transmitting component to a stationary server device via a second mobile transmitting component. One of the transmitting components is a motor vehicle and the other of the transmitting components is a mobile terminal device. Thus, information may be transferred from the motor vehicle via the mobile terminal device to the server device and, vice versa, from the mobile terminal device via the motor vehicle to the server device. The information is transferred in the form of data. This disclosure also correspondingly comprises a device for generating these data, wherein the device may be a motor vehicle or a mobile terminal device.

The described server device may be an Internet server, for example. Users of motor vehicles are able to create a user account on such a server device, to use personalized services, for example. Since these services are often connected to the motor vehicle of the user, a link between information from the motor vehicle and user data is required within the user account. Thus, the users may be required to perform a complex input of information regarding their motor vehicle, such as in an application (app) of their mobile terminal device, through which the users have identified themselves or have logged in to manage their user account. Thus, information regarding the motor vehicle has to be easily input into the mobile terminal device, to be transmitted from the mobile terminal device to the server device.

From DE 10 2012 012 565 A1, it is known that a motor vehicle may display information in the form of a QR code on a vehicle display screen, enabling the user to take a snapshot of the QR code with its mobile terminal device and thus provide the information via the motor vehicle to the mobile terminal device, to forward the same to the server device. In this case the interest lies in that the photographed QR code is not used repeatedly in an unauthorized way, for example, for registering the motor vehicle in two different user accounts.

DE 10 2013 100 756 B3 discloses the fact that a closing system of a motor vehicle may be operated by means of a mobile terminal device. The mobile terminal device thus receives an access code from a server device, which code may then be forwarded via the mobile terminal device to the closing system of the motor vehicle, so that it unlocks the motor vehicle. The access data are limited in time, i.e., they have an expiration time. Said information regarding the motor vehicle, which has to be stored in the user account of the server device, on the contrary, is generally permanently valid, so that it does not have an expiration time.

US 2013/0042314 A1 discloses user data, such as a password, being received by a terminal device, enabling a server device to verify the terminal device. In case of successful verification of the user data, a release signal is sent to the motor vehicle, so that the motor vehicle accepts commands from the terminal device. In this solution, a direct communication connection is thus required, on one hand, between the terminal device and the server device, and, on the other hand, between the motor vehicle and the server device.

DE 10 2012 211 731 A1 discloses the verification of a mobile terminal device by comparing its current location with a measured position, at which a sensor has detected the occupation of a seating place. An indirect transfer of information from a first transmitting component via a second transmitting component to a server device is not shown in this case.

BRIEF DESCRIPTION OF THE DRAWINGS/FIGURES

The accompanying drawing, which is incorporated herein and forms part of the specification, illustrates the present embodiments and, together with the description, further serves to explain the principles of the present embodiments and to enable a person skilled in the relevant art(s) to make and use the present embodiments.

FIG. 1 illustrates a schematic representation of a system composed of a first transmitting component, a second transmitting component, and a stationary server device, according to some embodiments.

The features and advantages of the present embodiments will become more apparent from the detailed description set forth below when taken in conjunction with the drawing, in which like reference characters identify corresponding elements throughout. In the drawing, like reference numbers generally indicate identical, functionally similar, and/or structurally similar elements.

DETAILED DESCRIPTION

The object of this disclosure is to transfer information from a first transmitting component, indirectly, via a second transmitting component, to a server device, and thus prevent an unauthorized reuse of this information.

This object is achieved by the subject matter of independent claims. Advantageous embodiments are provided by the characteristics of the dependent claims, by the following description and FIGURE.

This disclosure provides a method for indirectly transferring information from a first mobile transmitting component via a second mobile transmitting component to a stationary server device. One of the transmitting components may be a motor vehicle and the other of the transmitting components may be a mobile terminal device. A mobile terminal device may, for instance, be a smartphone, a tablet PC, or a smartwatch. In the method, the information is transferred from the first transmitting component, for example, the motor vehicle, via a first transfer interface, to the second transmitting component, for example, the mobile terminal device, and from the second transmitting component, via a second transfer interface, to the server device. Said information is represented during the transfer, or at transfer, by data. The information may be digitally encoded, for example. Said second transfer interface may comprise, for example, a mobile connection and/or an Internet connection.

After the transmission by the first transmitting component, to ensure that the information is used for the intended or planned one-time transfer to the server device and is not again used (for example, for a transfer at a subsequent time, by another terminal device, to the server device), the data are dynamically generated by the first transmitting component for transferring the information. Thus, in case of a repeated transfer of the information from the first transmitting component, and/or for transferring the information to another server device, different data are respectively provided. The server device accepts the information contained within the data if the data satisfy a predetermined validation criterion. In other words, the server device is adapted for considering the dynamic generation of data and to verify whether the received data are plausible in relation to the fact that they have actually been dynamically generated for transfer from the first transmitting component. In other words, the server device verifies whether the received data are not temporarily stored data, which were intended or have been used for another transfer at a previous time. The server device may check, for example, whether it has already received the data at a previous time from another transmitting device.

Advantageously, the data may be used once for the planned transfer of information and may be subsequently useless or unsuited for a manipulation in the server device.

The dynamic generation preferably occurs in that the first transmitting component integrates a current time information in the data, and the server device accepts the information if the time information is within a predetermined time interval. This corresponds to the validation criterion, through which the corresponding time interval is determined or indicated. The validation criterion may, for example, indicate that the data according to the time information should not be older than a predetermined maximum time duration, such as 10 minutes. Additionally or as an alternative to a time information, the first transmitting component may integrate a validity time interval in the data, and the server device may accept the information if, according to the validation criterion, the receipt time of data in the server device is within the validity time interval. In other words, the age of the data is not important, as long as they are received by the server device within the validity time interval.

The dynamic generation may also be made dependent from the location. In this context, it is then preferred when a current first position information of a location of the first transmitting component is integrated in the data by the first transmitting component. Thus, the motor vehicle provides, as an example, its global positioning system (GPS) coordinates as the first transmitting component. The second transmitting component, for example, the mobile terminal device, forwards or transmits to the server device, together with the data, a second position information of a location of the second transmitting component. In other words, the second transmitting component may also transmit its GPS coordinates to the server device, for example. The server device accepts the information from the first transmitting component when, according to the validation criterion, the first position information and the second position information define a distance that is smaller than a predetermined maximum distance. Thus, it is ensured that the user with the second transmitting component has to be near the first transmitting component, wherein "near" is defined by said maximum distance.

With the described methods for dynamic generation of data, said first transfer interface may be based on a standard technology. In this case, it is preferred that the data are transferred via a near-field communication (NFC) transfer device, a Bluetooth transfer device as a first radio-based transfer interface, or a universal serial bus (USB) interface as a first wired transfer interface; or transferred by generating a sequence of sounds as an acoustic transfer interface, or by displaying an image and/or a quick response (QR) code on a display screen as a first optical transfer interface. The second transmitting component can then detect the screen display by means of a camera. The image preferably comprises a view of a real object and/or a schematic representation of a real object.

The dynamic generation may however also involve the encoding of data, so that no standard transmission takes place. To this end, it is preferred that the data are transferred in the described way by displaying an image and/or a QR code on a screen, as a first optical transfer interface and that, for at least two transfers, different images and/or different QR encodings are used by the first transmitting component. The reconstruction of the information from the image and/or the decoding of the QR code is then possible in the server device, if the server may decrypt the image or the QR code.

The first transmitting component may also transfer validation data via a third transfer interface bypassing the second transmitting component to the server device, which validation data define the validation criterion. The data to be transferred may, for example, be encrypted using a dynamically generated password, and this password may then be transferred via the third transfer interface to the server device. The third transfer interface may comprise a mobile radio link and/or an Internet connection. Thus, the server device may accomplish a decryption of the encrypted data. The validation criterion is satisfied in this case if the decryption is correct.

To avoid such transfer of a password, it is, however, preferred that the data are encrypted by the first transmitting component using a public key of the server device. A public key is a first key from a key pair of a public-key-encryption method, such as those known in the art. The server device decrypts the data using its private key, which to this end has not been transferred by the first transmitting component to the server device. Thus, an end-to-end encryption from the first transmitting component to the server device is provided, without the need to first transfer a password in particular over a third transfer interface.

Up to this point, the information has been described as regarding a motor vehicle, such as its vehicle ID or the vehicle chassis number. It may also be the case, however, that the information is a password, for example, by which a computer program, such as the one of the motor vehicle, has to gain access to the user account to store status data therein, for example. If this information, such as a password, is modified, then it has to be ensured that it is not an attempted tampering. The first transmitting component, such as a mobile terminal device, or the second transmitting component, such as a motor vehicle, may thus receive a user input from a user to change the information. This modification of the information is performed, if, together with the user input, biometric identification data of at least one predetermined user is received. For example, fingerprint data may be verified, such as those which may be generated by a fingerprint sensor of a motor vehicle or a mobile terminal device. The motor vehicle may have such a fingerprint sensor also for authorizing a motor control apparatus, for example.

It is particularly preferred that the described method is provided for registering a motor vehicle in a user account. Through the transfer of information, a registration of a motor vehicle as a first transmitting component in the control device is thus performed. To this end, the information comprises a vehicle ID, such as a chassis number. This information is provided via a mobile terminal device as a second transmitting component for registration in the user account of a user of the terminal device, which is provided and/or managed by the server device. In the method, it is ensured that the user does not transfer any information with a vehicle ID of someone else's motor vehicle to the server device by using his or her terminal device, preventing entering or registering someone else's motor vehicles in his or her user account.

The method is based on the dynamic generation of data, which represent the information to be transferred. Correspondingly, a device provides information to a first transfer interface according to the method. This device may be a motor vehicle or a mobile terminal device. The first transfer interface, in particular, is the described screen for displaying an image and/or a QR code. The device has a processor device, with a program code, which is adapted, when executed by the processor device, for providing said information as data. The data are dynamically generated, so that in case of repeated provision of information and/or of transfer of information to another server device, different data are respectively provided or transferred to the first transfer interface.

An exemplary embodiment is described below. FIG. 1 shows a schematic representation of an embodiment of a system composed of a first transmitting component, a second transmitting component, and a stationary server device.

The exemplary embodiment described in the following is a preferred embodiment. The described components of the embodiment should be considered independently from each other, together as a whole, and in combinations different from the one shown. Moreover, the described embodiment may also be completed with previously-described characteristics and components.

FIG. 1 shows a system 10 with a motor vehicle 11, a mobile terminal device 12 and a server device 13. In the example shown, the motor vehicle 11 is a first transmitting component, and the mobile terminal device 12 is a second transmitting component. The motor vehicle 11 preferably is a car, in particular a passenger car. The mobile terminal device 12 may be a smartphone, a tablet PC, or a smartwatch.

The mobile terminal device 12 may be owned by a user (not shown). The user has stored a user account 14 in the server device 13, and wishes to register its motor vehicle 11 therein. To this end, he has to read a vehicle ID from the motor vehicle 11, for example, to be entered into the user account 14 as information 15. In the user account 14, a connection between the user name AB of user USER and vehicle ID (XY as information 15) of motor vehicle 11 (CAR) is established. This can enable, for example, provision of online services to the user in the motor vehicle 11.

However, the user is not required to enter the vehicle ID as information 15 in a complicated way into his mobile terminal device 12, for example. The vehicle ID represents, in this case, information 15 that has to be transferred by the motor vehicle 11, as a first transmitting component, via the mobile terminal device 12, as a second transmitting component, into the server device 13, to enter or register the same information 15 in the user account 14.

To this end, in the motor vehicle 11, a processor device 16 is provided, which has a program code 17, which sends the information 15 to the mobile terminal device 12. This may occur on a display device 18, such as a screen, upon which data 19 are optically or graphically represented, which contain the information 15. The data 19 may, in particular, be a QR code or an image of an object or a schematic view of the object. The display device 18 is a first transfer interface, for transferring data 19 from motor vehicle 11 to mobile terminal device 12. The user may use a camera 20 of the mobile terminal device 12, for reading or entering the data 19 into the mobile terminal device 12. To this end, the user directs a detection area 21 of the camera 20 to the display device 18, so that the data 19 are detected by the camera 20 and thus are present in the mobile terminal device 12. The mobile terminal device 12 may now transfer the data 19, for example, via a radio connection 22 to a mobile radio network 23 and via an Internet connection 24 of the Internet 25 to the server device 13. The radio connection 22 and the Internet connection 24 represent a second transfer interface.

It may be foreseen that the information 15 is not directly represented as data 19, but information 15 can be encrypted by the processor device 16 based on a public key 26. The server device 13 may then perform a decryption using a private key 27, so that the data 19 are decrypted.

In order to validate that the mobile terminal device 12 has actually received data 19 from the motor vehicle 11, and that the data 19 are also up to date, a validation criterion 28 is verified by the server device 13. The processor device 16 in the motor vehicle 11 may, for example, additionally integrate a time stamp with the current time as information 15 into the data 19. The server device 13 may then verify, based on its own timer device (not shown), as a validation criterion 28, whether the received data 19 are younger than a predetermined maximum age, thus for example earlier than 10 minutes or earlier than 5 minutes. In this case, the validation criterion 28 is met and the information 15 contained in data 19 is accepted for input into the user account 14 and is stored therein.

The information 15 is thus credentials of the motor vehicle 11, which cannot be manipulated or copied on their way to the server device 13.

Contrary to the described exemplary embodiment, it may also be contemplated that these credentials, such as a password, are transferred from the mobile terminal device 12 to the motor vehicle 11, in order for the motor vehicle 11 to communicate over a third transfer interface, a mobile radio connection 22 and/or an Internet connection 24, with the server device 13. These credentials may be used by the motor vehicle 11 to sign in on the server device 13, and to establish the connection to the user account 14. A manual issuing of a new password, for example, may be accepted after fingerprint validation or by generating a sequence of sounds as an acoustic transfer interface.

Conversely, in the described manner, the vehicle ID may be used by the mobile terminal device 12 for associating a motor vehicle 11 to the user account 14 of the user, in that it associates this information 15 on the server device 13.

The securing may occur, in the described way, via the encrypted connection.

The described QR code or its content may be dynamically generated and may be based on a public key 26 on the motor vehicle 11. Thus, an end-to-end encryption of the transfer may occur. The server device 13 has, in particular, the private key 27. Thus a replay-attack (for example, assigning the motor vehicle 11 to another user account, based on the photographed QR code) may be rendered impossible. Thus, also, a direct transfer of information from the motor vehicle 11 to the server device 13 is unnecessary.

The invention claimed is:

1. A method for indirectly transferring information from a first mobile transmitting component to a stationary server device via a second mobile transmitting component, wherein the information is represented by data, the method comprising:

dynamically generating, by the first mobile transmitting component, the data for transfer of the information, so that the data are unique at generation, further comprising:
  integrating, by the first mobile transmitting component, a current first position information regarding a location of the first mobile transmitting component into the data;
transferring the information from the first mobile transmitting component to the second mobile transmitting component via a first transfer interface;
transferring the information from the second mobile transmitting component to the server device via a second transfer interface, further comprising:
  transmitting, by the second mobile transmitting component, together with the data, a second position information regarding a location of the second mobile transmitting component to the server device;
comparing, by the server device, the data to a predefined validation criterion; and
accepting, by the server device, the information contained in the data that meets the predefined validation criterion,
  wherein the predefined validation criterion comprises the current first position information and the second position information defining a distance from each other that is smaller than a predetermined maximum distance.

2. The method of claim 1, further comprising:
integrating, by the first mobile transmitting component, a current time information or a validity time interval into the data; and
accepting, by the server device, the information in the data that meets the predefined validation criterion,
  wherein the current time information is within a predetermined time interval, or
  wherein a receiving time of the data in the server device lies within the validity time interval.

3. The method of claim 1, wherein the first transfer interface is a near-field communication (NFC) transferring device, a Bluetooth-transferring device as a radio-based first transferring interface, or a USB interface as a wired first transferring interface, or by generating a sequence of sounds as an acoustic transferring interface, or by displaying an image or a quick response (QR) code via a display screen as an optical first transferring interface.

4. The method of claim 1, wherein the data are transferred by displaying an image or a quick response (QR) code via a display screen as an optical first transferring interface, and wherein the data are used for at least two transfers of different images or different QR encodings by the first mobile transmitting component.

5. The method of claim 1, further comprising:
transferring, by the first mobile transmitting component via a third transfer interface, by bypassing the second mobile transmitting component, validation data to the server device, wherein the validation data define the predefined validation criterion.

6. The method of claim 5, wherein the third transfer interface is a mobile radio connection or an Internet connection.

7. The method of claim 1, further comprising:
dynamically generating, by the first mobile transmitting component, encrypted data, using a public key of the server device; and
decrypting, by the server device, the encrypted data using a private key of the server device.

8. The method of claim 1, further comprising:
receiving, by the first mobile transmitting component or by the second mobile transmitting component, a user input of a user for changing the information; and
changing the information in response to receiving, together with the user input, biometric identification data of at least one predetermined user.

9. The method of claim 1, further comprising:
registering a motor vehicle as the first mobile transmitting component in the server device, using the information transferred to the server device,
  wherein the information comprises a vehicle ID,
  wherein the information is transferred via a mobile terminal device as the second mobile transmitting component for input in a user account of a user of the mobile terminal device, and
  wherein the user account is provided or managed by the server device.

10. The method of claim 1, wherein the first mobile transmitting component is a mobile terminal device and the second mobile transmitting component is a motor vehicle.

11. The method of claim 1, wherein the second transfer interface is a mobile radio connection or an Internet connection.

* * * * *